J. W. WEED.
Check-Piece for Head-Stalls.
No. 203,095. Patented April 30, 1878.
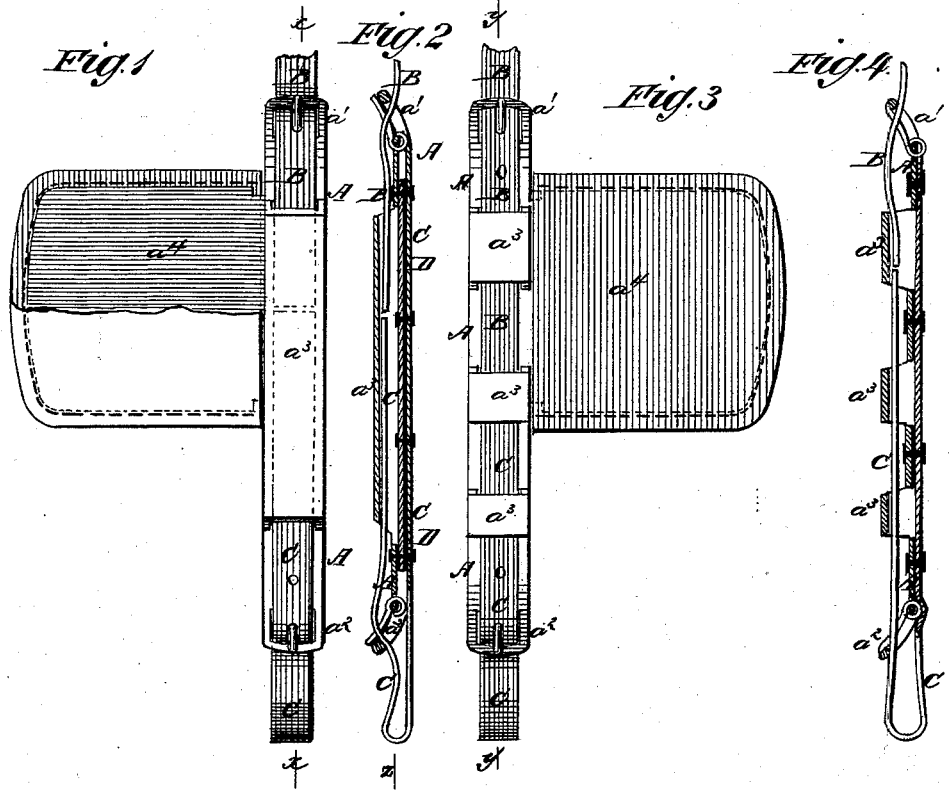

UNITED STATES PATENT OFFICE.

JAMES W. WEED, OF PRESCOTT, IOWA, ASSIGNOR TO HIMSELF AND GRANVILLE H. CURRIER, OF SAME PLACE.

IMPROVEMENT IN CHEEK-PIECES FOR HEADSTALLS.

Specification forming part of Letters Patent No. 203,095, dated April 30, 1878; application filed February 26, 1878.

*To all whom it may concern:*

Be it known that I, JAMES W. WEED, of Prescott, in the county of Adams and State of Iowa, have invented a new and Improved Cheek-Piece for Headstalls, of which the following is a specification:

Figure 1 is a front view of my improved cheek-piece, part of the blind-cover being removed. Fig. 2 is a longitudinal section of the same, taken through the line $x\, x$, Fig. 1. Fig. 3 is a front view of a modified form of the same. Fig. 4 is a longitudinal section of the same, taken through the line $y\, y$, Fig. 3.

Similar letters of reference indicate corresponding parts.

The object of this invention is to furnish an improved cheek-piece for headstalls which shall be simple in construction, convenient in use, and durable, which will render unnecessary the great amount of stitching heretofore required in making headstalls.

The invention will first be described in connection with the drawing, and then pointed out in the claim.

A is the cheek-piece, which is cast of some suitable metal or composition of metals. The cheek-piece A has a buckle, $a^1$, formed upon its upper end, into which the crown-strap B of the headstall is buckled, and has a buckle, $a^2$, formed upon its lower end, into which the bit-strap C is buckled. Upon the cheek-piece A is formed a loop or keeper, $a^3$, to receive the ends of the straps B C. Upon the forward edge of the cheek-piece A is formed a blind-plate, $a^4$, which is designed to be covered with leather, and may be used or not, as may be desired. The loop $a^3$ may be made continuous, as shown in Figs. 1 and 2, or in sections, as shown in Figs. 3 and 4. When the loop $a^3$ is made continuous the bit-strap C is riveted to a plate, D, which is riveted at its ends to the cheek-piece A at the ends of the loop $a^3$. When the loop $a^3$ is made in sections the plate D need not be used, as the bit-strap C can be riveted to the cheek-piece A between the loop-sections, as shown in Fig. 4.

Having thus fully described my invention, I claim as new and desire to secure by Letters Patent—

The metallic cheek-piece A, having a buckle, $a^1$, for the crown-strap, a buckle, $a^2$, for the bit-strap, the loop $a^3$, and the blind-plate $a^4$, as shown and described.

JAMES WILLIAM WEED.

Witnesses:
 THOS. L. MAXWELL,
 J. C. MAXWELL.